(12) United States Patent
Blinn et al.

(10) Patent No.: US 7,987,251 B2
(45) Date of Patent: Jul. 26, 2011

(54) VALIDATION OF DOMAIN NAME CONTROL

(75) Inventors: Arnold Blinn, Bellevue, WA (US); Cynthia Hagan, Seattle, WA (US); Don Gillett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 11/228,926

(22) Filed: Sep. 16, 2005

(65) Prior Publication Data
US 2007/0067465 A1    Mar. 22, 2007

(51) Int. Cl.
G06F 15/173    (2006.01)
(52) U.S. Cl. .................................................... 709/223
(58) Field of Classification Search .................. 709/223
See application file for complete search history.

(56) References Cited

U.S. PATENT DOCUMENTS

| | | | |
|---|---|---|---|
| 5,276,884 A * | 1/1994 | Mohan et al. ................ 711/163 |
| 5,511,122 A * | 4/1996 | Atkinson .................... 713/153 |
| 5,948,061 A | 9/1999 | Merriman |
| 6,119,152 A | 9/2000 | Carlin |
| 6,119,234 A * | 9/2000 | Aziz et al. ........................ 726/11 |
| 6,182,131 B1 * | 1/2001 | Dean et al. .................... 709/222 |
| 6,249,873 B1 | 6/2001 | Richard |
| 6,301,609 B1 | 10/2001 | Aravamudan |
| 6,317,777 B1 * | 11/2001 | Skarbo et al. ................ 709/204 |
| 6,374,292 B1 | 4/2002 | Srivastava |
| 6,449,657 B2 | 9/2002 | Stanbach, Jr. |
| 6,718,387 B1 * | 4/2004 | Gupta et al. .................. 709/226 |
| 6,745,248 B1 * | 6/2004 | Gardos et al. ................. 709/245 |
| 6,880,007 B1 * | 4/2005 | Gardos et al. ................. 709/225 |
| 6,895,431 B1 * | 5/2005 | Bero ............................. 709/220 |
| 6,904,415 B2 * | 6/2005 | Krahn et al. ..................... 705/50 |
| 6,907,525 B2 * | 6/2005 | Pazi et al. ..................... 713/170 |
| 6,912,564 B1 | 6/2005 | Appelman |
| 6,961,783 B1 * | 11/2005 | Cook et al. .................... 709/245 |
| 7,024,458 B2 * | 4/2006 | Chan et al. .................... 709/206 |
| 7,065,784 B2 * | 6/2006 | Hopmann et al. ................ 726/4 |
| 7,076,541 B1 * | 7/2006 | Burstein et al. ............... 709/223 |
| 7,089,325 B1 | 8/2006 | Murtza |
| 7,130,878 B2 * | 10/2006 | Parsons et al. ................ 709/202 |
| 7,136,869 B2 | 11/2006 | Holcombe |

(Continued)

OTHER PUBLICATIONS

ICANN, Policy on Transfer of Registrations between Registrars, Jul. 12, 2004, http://www.icann.org/en/transfers/policy-12jul04.htm, pp. 1-3.*

(Continued)

*Primary Examiner* — Wing F Chan
*Assistant Examiner* — Alicia Baturay
(74) *Attorney, Agent, or Firm* — Shook, Hardy & Bacon LLP

(57) ABSTRACT

A system, operable on one or more computers, and a computer-readable media are presented for validating an assertion made by a user that he or she controls a domain name. The system comprises an assertion receiver, authorization code generator, and a validation component. The assertion receiver receives either an explicit or an implicit indication that a particular user exercises control over a domain name. The authorization code generator provides an authorization code, to be electronically published in a Domain Name System (DNS) record associated with the domain name. After the authorization code has been inserted in a DNS record, the validation component accesses the DNS record to determine presence of the authorization code within the DNS records. If the authorization code is present, control of the domain by the user is established.

7 Claims, 11 Drawing Sheets

U.S. PATENT DOCUMENTS

| | | | |
|---|---|---|---|
| 7,194,552 B1* | 3/2007 | Schneider | 709/245 |
| 7,200,637 B2* | 4/2007 | Klos et al. | 709/206 |
| 7,296,088 B1* | 11/2007 | Padmanabhan et al. | 709/238 |
| 7,299,491 B2* | 11/2007 | Shelest et al. | 726/4 |
| 7,308,709 B1* | 12/2007 | Brezak et al. | 726/10 |
| 7,313,815 B2* | 12/2007 | Pazi et al. | 726/7 |
| 7,321,969 B2 | 1/2008 | Schoen | |
| 7,330,971 B1* | 2/2008 | Kukreja et al. | 713/168 |
| 7,346,839 B2* | 3/2008 | Acharya et al. | 1/1 |
| 7,356,534 B2* | 4/2008 | Mohammed et al. | 1/1 |
| 7,392,388 B2* | 6/2008 | Keech | 713/170 |
| 7,464,136 B2* | 12/2008 | Lemson et al. | 709/203 |
| 7,600,042 B2* | 10/2009 | Lemson et al. | 709/245 |
| 7,634,809 B1* | 12/2009 | Schneider et al. | 726/22 |
| 2001/0043595 A1 | 11/2001 | Aravamudan | |
| 2002/0007398 A1 | 1/2002 | Mendiola | |
| 2002/0059146 A1* | 5/2002 | Keech | 705/64 |
| 2002/0103740 A1* | 8/2002 | Maroney | 705/37 |
| 2003/0145058 A1* | 7/2003 | Chan et al. | 709/206 |
| 2003/0163730 A1 | 8/2003 | Roskind | |
| 2003/0172145 A1 | 9/2003 | Nguyen | |
| 2003/0200267 A1* | 10/2003 | Garrigues | 709/206 |
| 2004/0003251 A1 | 1/2004 | Narin | |
| 2004/0030887 A1 | 2/2004 | Harrisville-Wolff | |
| 2004/0059712 A1 | 3/2004 | Dean | |
| 2004/0162997 A1* | 8/2004 | Hopmann et al. | 713/201 |
| 2004/0167982 A1* | 8/2004 | Cohen et al. | 709/226 |
| 2004/0172456 A1 | 9/2004 | Green | |
| 2004/0250129 A1 | 12/2004 | Clough | |
| 2005/0015449 A1* | 1/2005 | Klos et al. | 709/206 |
| 2005/0192899 A1 | 9/2005 | Reardon | |
| 2005/0198173 A1* | 9/2005 | Evans | 709/206 |
| 2005/0198386 A1 | 9/2005 | Accapadi | |
| 2005/0216587 A1 | 9/2005 | John | |
| 2005/0289084 A1 | 12/2005 | Thayer | |
| 2005/0289221 A1* | 12/2005 | Steele | 709/206 |
| 2006/0026237 A1 | 2/2006 | Wang | |
| 2006/0053279 A1* | 3/2006 | Coueignoux | 713/154 |
| 2006/0101113 A1 | 5/2006 | Lemson | |
| 2006/0165060 A1* | 7/2006 | Dua | 370/352 |
| 2006/0174018 A1 | 8/2006 | Zhu | |
| 2006/0218303 A1 | 9/2006 | Adelman | |
| 2006/0230380 A1* | 10/2006 | Holmes et al. | 717/117 |
| 2006/0265589 A1 | 11/2006 | Murtza | |
| 2007/0027965 A1* | 2/2007 | Brenes et al. | 709/220 |
| 2007/0067395 A1* | 3/2007 | Blinn et al. | 709/206 |
| 2007/0067396 A1* | 3/2007 | Blinn et al. | 709/206 |
| 2007/0067457 A1* | 3/2007 | Blinn | 709/226 |
| 2007/0112627 A1 | 5/2007 | Jacobs | |
| 2007/0271393 A1* | 11/2007 | Wong | 709/245 |

OTHER PUBLICATIONS

Postel, J. B., "Simple Mail Transfer Protocol," RFC 821, Information Sciences Institute, University of Southern California, Aug. 1982.

Myers, J., "Post Office Protocol—Version 3," RFC 1939, Carnegie Mellon, May 1996.

Mockapetris, P., "Domain Names—Implementation and Specification," RFC 1035, Information Science Institute, University of Southern California, Nov. 1987.

Rekhter, Y., "Interaction Between DHCP and DNS," Internet Draft, draft-ietf-dhc-dhcp-dns-04.txt, May 1997.

Andy Koopsman, et al, "Microsoft® Exchange 2000 Server Resource Kit", Aug. 30, 2000, Microsoft Press, Part 5: Chapter 19.—Instant Messaging Overview.

Duncan Mackenzie and Joel Semeniuk, "Exchange & Outlook®: Constructing Collaborative Solutions", Jun. 2000, David Dwyer, First Edition, Part III: Appendix C.—Instant Messaging Services.

Microsoft Active Directory and Active Directory Services Interfaces, TechNET Website; under Windows NT 4.0; Active Directory—Download link, 2 pages, 1998.

* cited by examiner

VALIDATION OF DOMAIN NAME CONTROL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Standards have developed to ensure that, as the number of computer accounts increase, personal accounts will remain unique, so that they may continue to serve as a means of locating an Internet Protocol (IP) destination address for an individual account owner. "JohnSmith@domain.example" is an exemplary personal account name. The portion of this account name to the right of the "@" symbol is called a Domain Name (DN). The portion to the left of the "@" symbol of the exemplary account name is a user name. Such a personal account name, is not limited to, but may be used for the purpose of communicating by electronic mail (email), communicating by Instant Messaging (IM), accessing a single sign-on service, accessing a digital wallet service, accessing restricted web pages, conducting a Voice over IP session, conducting a video conferencing session, conducting a white-boarding session, conducting a real time web meeting, or any other web service.

Some observers have estimated that there are more than 60 million domain names in operation, and yet the stylistic freedom in choosing an account name for the individual account owner is typically severely restricted. In the example cited above, the exemplary domain name is "domain.example". The portion of this domain name to the right of the period is called a Top Level Domain or TLD. There is not much creativity allowed in the choice of a TLD because there are only a few hundred TLD's that are permitted within industry standards. The name to the left of the period in our exemplary domain name is called a Second-Level Domain or SLD. For historical reasons, most users are crowded together under a few SLD's that carry an implied TLD. For example, many millions of accounts coexist under the common domain name of their internet service providers such as "juno.com", "aol.com", "msn.com", and "comcast.net". The crowding can be even worse in domain names associated with web-based email providers such as "hotmail.com", "gmail.com", or "yahoo.com". If a user wanted to create a user account under the user name "JohnSmith", he would typically find his desired name disallowed, or unavailable, since there are thousands people with the name John Smith on the web, and a significant fraction of them may want the same user name under the same domain name.

Some users have opted to register their own domain names. Registrars such as Network Solutions, Tucows, godaddy, Register, and Aplus will, for a small fee (typically about 10 dollars per year) register and maintain a domain name of the customer's own choosing, provided it is still available. The Domain Name System (DNS) is a distributed database system that returns records associated with a domain name, and is primarily responsible for returning IP addresses for a number of possible services. As appreciated by those skilled in the art, registrars usually provide a DNS server that maintains the records for servers that provide DNS services. A DNS record may indicate a web server where web pages are hosted for a web browser (referred to as an A-Record), while a Session Initiation Protocol (SIP) related-record may map to services such as instant messaging services for a domain. As known to those skilled in the art, SIP related DNS records may include SeRVice (SRV) and Naming Authority PoinTeR (NAPTR) records. A DNS entry may also include a Text record where any arbitrary text may be placed. There are basically three different services, that may be narrowly provided by a service provider company. There are those who sell domains (registrars), those who offer DNS service (DNS providers), and those who offer services (service providers). While a company might prefer to do all three, to pursue more profit, domain owners have the freedom to mix and match. It is common to have all three services provided by different companies. It is also common to have all three services at the same company. It is also common to have the registrar service and the DNS Provider service at the same company. It is possible to have the registrar service at one company and the DNS service at another company, but this is rare.

For small organizations or individuals, maintenance of DNS records can be confusing to the customer, and therefore, labor-intensive for the registrar to support. Evidence of this is found in the fact that some domain registrars make it difficult to transfer the domain. Naturally, small organizations would prefer live customer support, but this is costly to supply for a large customer base of potentially novice computer users. Registrars ordinarily offer hosting services as well. Some even give away domain registration if a hosting service is purchased. As hosting traffic increases, the hosting fees increase. When the traffic passes a certain threshold of activity, it is more efficient to purchase one or more dedicated servers, and to hire a dedicated staff of Information Technology (IT) experts to maintain the traffic associated with a domain.

Whether the DNS maintenance service is provided by a registrar, an independent hosting company or a dedicated IT staff, there is a disincentive to give away service to users who may want to use the domain name that an owner has registered. For example, the domain controller for an exemplary sports team such as MyTeam.com may wish to provide usernames to fans, but the cost of account initiation and management is prohibitive. This is particularly true in these days when exploits such as worms, email-borne and IM-borne viruses, spam, and phishing must be combated by the service host. Thus many desirable domain names are occupied, but underutilized. Those small organizations that register their own domain names face steep service fees that increase with activity, and in the past, the only alternative to these has been to purchase dedicated hardware and software and to develop expertise in maintaining and providing service.

As an alternative to moving all of the services associated with a domain name, certain services can be "outsourced" or performed by another remote server on the authority of the domain owner. For email outsourcing, someone may need to manually change a destination address or a host name in the Mail eXchange (MX) record of the DNS records. For IM outsourcing, someone may need to change a SIP-related record of the DNS records. This allows the traffic for email or IM respectively to be sent to an IP destination address within the web service provider. Similarly, to provide outsourced web hosting the A-Record in DNS can be updated. In all cases, the DNS provider simply points to IP addresses provided by the service provider.

There are various reasons that a first party may wish to validate that a second party has control of a domain name. It may be to allow different companies to provide the different services mentioned above. The first party may be a service provider who wishes to provide one or more services for the second party under a given domain name. If control of the domain name is not validated, then domain accounts within the service provider could be snapped up by fictitious owners and so be unavailable or encumbered when the genuine owners try to outsource services. In addition, there are several other possible reasons for validation. The first party may be qualifying second party websites which have offered advertising services for certain fees. As a step in this process, the first party may desire some tangible proof that the second party controls the domain name. As a second example, the first party may be buying domain names, and may wish to validate that the second party truly has control of the domain name. As a third example, the first party may be paying for some kind of account or service to be provided by the second party in association with a domain name, and so he may wish to validate that the second party has control of the domain name before payment is made.

Validation of domain name control can be uncertain, time-consuming, and therefore costly. Where the domain is held by a large company, one could contact the company and go through administrative channels to be referred to the proper person who is authorized to control domain services. One could also access the "whois" database, to determine an email account for the official domain owner. Whois describes a protocol for querying the database of domain ownership. Several organizations provide free whois database access. This database however is difficult to parse, and is often incomplete or inaccurate. It may contain minimal information, such as an e-mail address of an owner, who may have delegated control to others on his behalf. Moreover, some registrars offer the service of maintaining anonymity of domain ownership. The actual email account name remains private, and if email is sent to the proxy name that is listed in the whois record, the email may be falsely identified as spam by the proxy, and deleted. Anonymity potentially destroys the use of whois records. At least, anonymity service adds another level of indirection, possible failure, and delay. In many of these cases, the validation of domain name control is still be a manual process.

The use of personal contact, or whois records to validate domain name control is problematic when the validation needs to be performed periodically. This is particularly true for the example of the service provider who would like a frequent confirmation of domain name control during service. An ideal service provider would frequently validate the domain owner to ensure it hasn't been transferred or expired. Calling the contact daily (or even e-mailing them with an authentication link daily) isn't practical or scalable.

SUMMARY

To meet one or more of the above needs, a computerized system and method are presented which allow domain name control to be validated for a particular user. In one embodiment the system receives an assertion that a user exercises control over a domain name. A code is generated by the system and provided to either the user or an Application Programming Interface (API), to be embedded in a DNS record. After the code is inserted into the DNS record on behalf of the user, the system queries the DNS records to determine if the authorization code is present in the DNS records. If present, the control of the domain name by the user is validated. It should be noted that this Summary is provided to generally introduce the reader in a simplified form to one or more selected concepts described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a technique for validating the control of a domain. An exemplary operating environment for the present invention is described below.

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Figure 1:
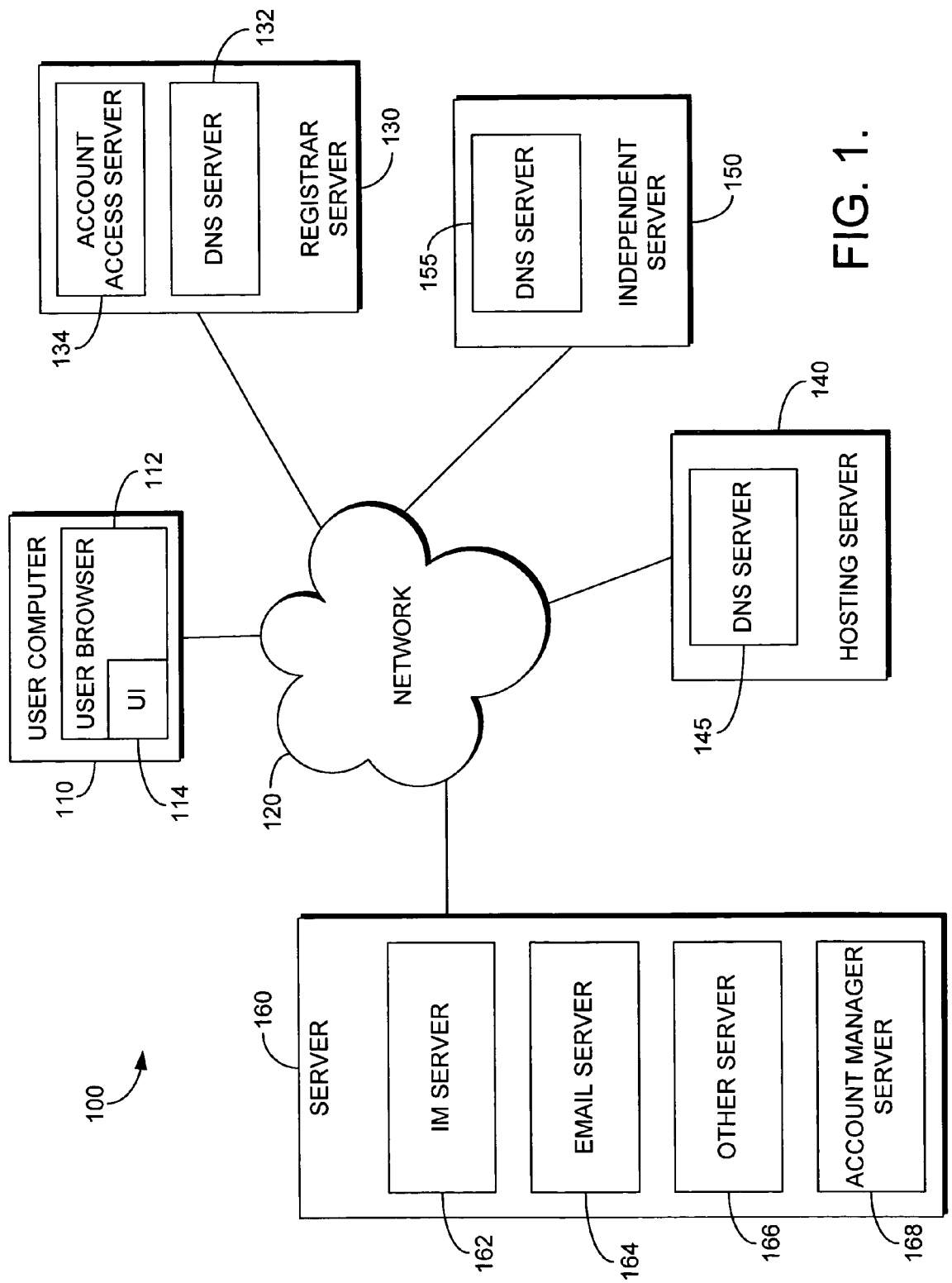
FIG. 1 is a block diagram of a network environment suitable for use in implementing the present invention.

Referring to the drawings in general and initially to FIG. 1 in particular, an exemplary operating environment for implementing the present invention is shown and designated generally as operating environment 100. The computing network environment 100 is only one example of a suitable computing environment and is not intended to suggest any limitation as to the scope of use or functionality of the invention. Neither should the computer 110 or the servers 130, 140, 150, 160 be interpreted as having any dependency or requirement relating to any one or combination of components illustrated in the exemplary operating environment 100. Servers 130, 140, 150, and 160, indicate a device that is able to host applications which provide services.

The invention may be described in the general context of computer-executable instructions, such as program modules, being executed by a computer or server. Generally, program modules include routines, programs, objects, scripts, components, data structures, etc., that perform particular tasks or implement particular abstract data types. Moreover, those skilled in the art will appreciate that the invention may be practiced with a variety of computer, or server configurations, including hand-held devices, laptop systems, desktop systems, multiprocessor systems, microprocessor-based or programmable-consumer electronics, workstations, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, a user computer 110 is illustrated having a browser 112 accessible through a user interface (UI) 114. The user computer 110 may be connected over a network 120 to a remote server such as a Registrar server 130, an independent server 150, a hosting server 140, or a server 160. A particular server such as the server 160 may have one or more communications servers running such as an IM server 162, an email server 164, other server 166, or an account manager server 168. Server 166 may provide a single sign-on service, a digital wallet service, restricted web service, Voice over IP service, video conferencing service, white-boarding service, real time web meeting service, or any other web service. A server 160 may perform email services through an email server such as 164. A server 160 may alternatively, or jointly provide IM services through an IM server such as 162. A server such as 160 may be operated by service providers such as MSN, yahoo, aol, Comcast, or google to name a few.

An application on server 160 such as the account manager server 168 may access other DNS servers such as server 132, 145, or 155 for the purpose of reading the DNS records. A user computer 110 may access a personal account for the management of controlled DNS records, for example, by communicating with an account access server 134. Procedures of various kinds such as local, remote, automated, or manual procedures may be available for editing the DNS records associated with a controlled domain name at any one of the DNS servers 132, 145, or 155. A user may interact with a DNS server as a local client computer user logged into servers 130, 140, 150, or 160. Alternatively, a user may have remote access to manage a DNS server such as 132 through a UI 114 on a browser 112 residing on a remote user computer 110.

The communication of content such as data and objects that takes place between applications on user computers or servers may make use of various protocols, media, and devices as appreciated by those skilled in the art. For example, the network may make use of IP, and User Datagram Protocol (UDP) or Transmission Control Protocol (TCP). A browser 112 may for example make use of HyperText Transfer Protocol (http), HyperText Transfer Protocol Secure (https), File Transfer Protocol (ftp). Servers such as 162, 164, 166 may make use of Session Initiation Protocol (SIP), Internet Relay Chat (IRC), Session Description Protocol (SDP), Simple Mail Transfer Protocol (SMTP), Sip for Instant Messaging and Presence Leveraging Extensions (SIMPLE), or similar protocols indicated by the service. Content may, for example, be in HyperText Markup Language (html), Extensible Markup Language (xml), Jscript, JavaScript, Visual Basic Script (VBScript), ActiveX, or Java. A server such as 134 or 168 may make use of Common Gateway Interface (CGI), Practical Extraction and Report Language (PERL), or similar and related technologies. These protocols, media and objects are exemplary and do not preclude the use of similar or related protocols, media, and objects.

A computer such as 110 or a server such as server 130, 140, 150, or 160 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer such as 110 or a server such as server 130, 140, 150 or 160.

As previously mentioned, the present invention may be described in the general context of computer-useable instructions. Computer-useable instructions include functions, procedures, schemas, routines, code segments, and modules useable by one or more computers, servers, or other devices. The computer-useable instructions form an interface to allow a computer to react according to a source of input. The instructions cooperate with other code segments to initiate a variety of tasks in response to data received in conjunction with the source of the received data.

Figure 2:
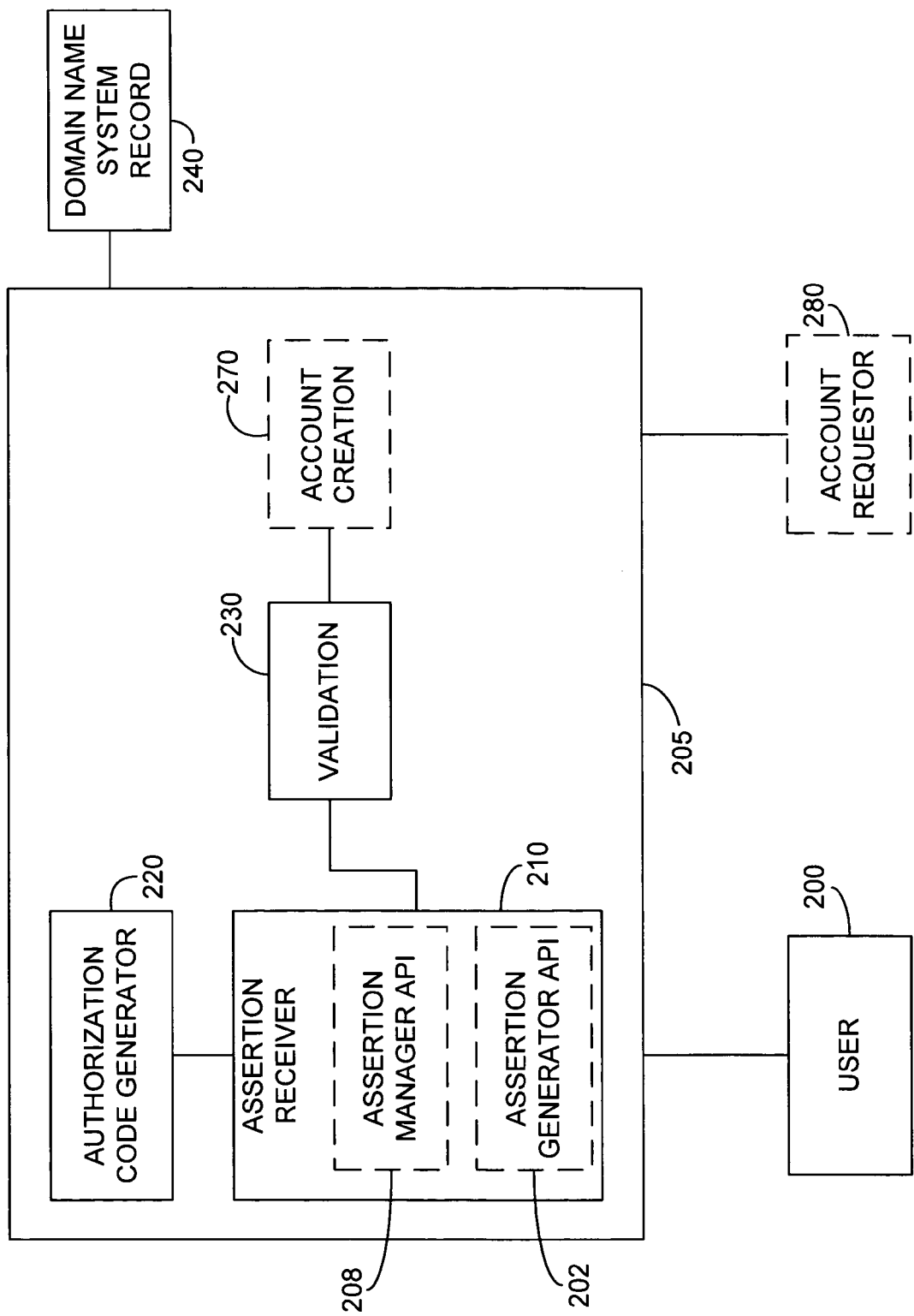
FIG. 2 is a diagram of an exemplary system for use in validating control of a domain.

FIG. 2 depicts a system 205 consisting of program modules or components for validating the control of a domain name, and shows some optional components with a dashed border. The system includes an assertion receiver component 210. In one embodiment, a user 200 interacts with the assertion receiver component to assert that the user controls a domain. This interaction may, for example, take place over a secure web connection in which the user types in the domain name that he controls into an appropriate field in a web form, thus asserting a claim to control over the domain name. As appreciated by those skilled in the art, this interaction may also take place through a menu or other interface. The assertion receiver 210 associates the user with the domain name that the user claims to control. In response to the assertion, the validation system 205 generates an authorization code in the authorization code generator 220. This code is then provided by the system 205 to the user 200 together with instructions for the user, as to how the DNS record 240 should be modified to include this authorization code. The user 200 then follows the instructions to electronically publish the authorization code, that is, to modify the DNS record 240 to include, at least, the authorization code. As those skilled in the art will appreciate, such instructions will vary with the entity that hosts a DNS server associated with the domain.

The instructions may be as simple as providing a customer service number that should be called, together with instructions about what to tell the customer service agent. The instructions may include a menu of common registrars, with special instructions directed at their particular procedures. The instructions may be extremely detailed, including for example alternative instructions for different servers, instructions about how to run an editor to modify a DNS record 240, a tutorial on Berkeley Internet Name Domain (BIND) or other necessary steps to facilitate modification. Once the user has completed modification of the DNS record 240 to include the authorization code, the system 205 validates the inclusion of the authorization code by accessing the DNS record 240, and verifying within the validation component 230 that a DNS record 240 contains the authorization code that was earlier provided to the user.

The authorization code produced by the authorization code generator 220 may be implemented in a variety of ways. For example, the code could be a Globally Unique IDentifier (GUID), such as a 128 bit code generated by combining the local Ethernet serial number with date and time. As appreciated by those knowledgeable in the art, there are a number of code generation and storage alternatives that include local, centralized, and coordinated generation. The authorization code could be a hash of a combination of a user account ID number, the domain name being validated, and a unique secret known only to the validating entity. This last possibility has the advantages that it requires no additional state data in the code generator 220, and can be regenerated and re-validated within a user account.

The validation component 230 may operate in a variety of ways, as appropriate to a particular embodiment. It may only be performed as a one-time event, or it may be repeated periodically as appropriate. For example, the validation may be performed as a screening step to set up sale and transfer of a domain, and so it is only needed until the sale is complete. As a second example, if the validation is performed in connection with a service agreement, the validation may be re-performed in this example every time that there is a change to a service agreement. As a third example, if the validation is performed for the purpose of account creation (e.g. the service being provided is a communication service requiring the creation of e-mail accounts that can interact with other users), the validation could be re-performed every time someone requests an account with that domain name. In this last example, the validation may alternatively be performed periodically, for example twice daily, to confirm that the accounts associated with the domain name are still authorized by the controller of the domain name. The validation may also be activated by a user interface control at the opportunity or discretion of the user 200, for example, to allow a newly appointed domain owner to simultaneously validate himself and invalidate the old owner.

According to another embodiment, the assertion receiver component 210 could be implemented in a distributed fashion with an assertion generator API 202 running on one server, and an assertion manager API 208 running on another remote server. For example, the assertion generator API 202 could be running on an account access server 134 within a registrar server 130 as shown in FIG. 1, while the assertion manager API 208 is running on an account manager server 168 on a server 160, also shown in FIG. 1. In one embodiment, the assertion generator API 202 is implemented with the advantage of automation on the registrar server. This allows the modification of the DNS record 240 to be accomplished in an automated fashion as a local process within the registrar server. Thus, for example, a user 200 first logs into his account access server 134 at his registrar server 130, and this registrar authenticates his DNS management account by asking for a username and password. The account access server 134 then makes an offer which requires a third party to validate domain ownership. When the user selects this offer, the assertion generator API 202 communicates with the assertion manager API 208, to complete the validation process cooperatively. In one embodiment, a restricted access account is created on server 160 and associated with a domain. In conjunction with the cooperation of the assertion manager API 208 with the assertion generator API 202, the authorization code is received by the assertion generator API 202 at the registrar server 130. The assertion generator API 202 then automatically modifies the DNS record 240, inserting the authorization code into a DNS record 240 on behalf of the user who requested the offer requiring third party validation. The assertion generator API 202 then prompts the validation component 230 to determine whether the authorization code is published in a DNS record 240. When the validation is complete, the user is informed that the offer is accepted. Now the user can sign-into the service provider and configure his/her service.

According to another embodiment, the system 205 can be used with the advantage of enabling a domain controller to permit personal accounts to be created under a controlled domain name with minimal administrative overhead incurred by the domain owner. The system 205 may allow the validation of another domain name to be controlled and operated by an email service provider. For example, assume that the controller of a domain (say MyTeam.com) has decided to make this domain available for any user, so that users can choose account names like star@MyTeam.com. The email accounts for this example will be serviced by a representative, but fictitious email service provider emailProvider on an email server such as 164 resident at a server 160. The user 200 in the discussion of this exemplary embodiment is the IT manager who has authority to change the DNS server 155 on an independent server such as 150. The user 200 then supplies the domain name to the assertion receiver 210 in conjunction with a request to outsource email service. In this case the assertion receiver 210 identifies the service chosen, which is email in this example. Related examples may allow for other alternative individual services to be identified, such as IM, digital wallet service, restricted web pages, VoIP, video conference, white-boarding, real time web meeting, etc. A combination of these services may, in other examples, be identified as a group to be outsourced as a package.

The user 200 may additionally agree to the service terms in general or detail. For example, the user 200 may be presented with a detailed document including outsourcing account management details such as benefits, rights and liabilities of the different parties involved. The service terms may include a policy for account creation. A policy is a rule for administering one or more services provided by the web services provider. In this example, emailProvider provides services on behalf of the domain controller MyTeam.com. A representative policy may simply be allowing an administrator to control the service, for example, by admitting or excluding users from being assigned user names within the domain name. An administrator, at a minimum, has authority to agree to the terms of service. Another representative policy may include the option to restrict accounts that may be created by taking a user-supplied exclude list, to recognize behaviors that are unacceptable for account users, to perform a procedure for restricting misbehaving account users, or to use a list of user-supplied account names whose associated traffic will be forwarded to a mail server in the independent server 150.

In the present example, the user 200 accepts a policy to allow automatic account creation. This policy means that a domain is "opened" for general access for the creation of accounts, with very little administrative overhead for the domain owner. After outsourcing service is established, an independent server such as server 150 is not burdened with excessive management traffic. An account requestor 280 asks for a specific account name, the account request is handled by an account manager server such as 168, resident on an emailProvider server such as 160. Thus the independent server, such as server 150, is relieved of the most burdensome administrative functions such as policy enforcement related to the email traffic.

The system 205 returns an authorization code to the user 200 who modifies the appropriate place in his DNS record 240 on the independent server 150. In the present exemplary embodiment the user 200 receives instructions from the system 205 to change the MX record in the DNS records to list a server IP address supplied by emailProvider, and to electronically publish the authorization code in the DNS record 240. Alternatively, instructions could have been given to modify the Mx record to list a specified a host name, possibly containing wildcards as appreciated by those skilled in the art. The validation component 230 then accesses the DNS record 240, finds the authorization code included therein, and enables account creation within the namespace MyTeam.com, to be serviced by emailProvider, for example, on an email server 164 of server 160. In other embodiments additional tests may also be performed by the system 205 to verify that the service is properly configured. For example, as a condition of enabling account creation within the namespace, the system could verify that a correct IP address is contained within the Mx record, or alternatively that a hostname listed in the Mx record resolves to a correct IP address for the service. An exemplary account requestor 280 may then request an account from an account creation component 270 of the system 205. In one embodiment, an account requestor fills out a form asking for the account star@MyTeam.com, and an account creation component 270 is used by the system 205 to perform all processes appropriate to create this account such as: re-validating domain control, screening for availability, screening for appropriateness, performing a challenge-response test (to prevent malicious users from automatically creating accounts), receiving an approved password, assigning space limits, associating policy, and enabling the account.

According to another embodiment, a user 200 may make use of the system of the present invention while retaining personal administrative control over the account names created. For example, suppose a small business that owns the domain name buycheese.com, hosted by a hosting server 140 that operates a DNS server 145. Suppose this domain name owner wants to make use of a service provider's servers to create IM accounts for its employees and for all their cheese suppliers for the purpose of changing orders and getting answers about products. In this example the IM accounts will be serviced by a representative, but fictitious email service provider IMprovider on an email server such as 162 resident at a server 160. Such an application would preferably allow the user 200 to retain administrative control over accounts associated with the domain name. In this embodiment, the assertion receiver 210, authorization code generator 220, and validation component 230 perform operations as described above in connection with other embodiments of the invention.

A user 200 interacts with the assertion receiver 210 to assert that the user controls the domain. The assertion receiver 210 prompts the user 200 to associate an administrator account with this domain name. This may involve only authenticating an existing account by receiving a valid username and password. Alternatively, the system 205 may create an administrator account, performing appropriate functions such as assisting the selection of an account name, performing a challenge-response test, and assigning a suitable password. An administrator, at a minimum, has authority to agree to the terms of service, but in this exemplary embodiment also takes a direct hand in creating and governing accounts created under a domain name. In one embodiment, multiple administrators may be defined. In another embodiment, these multiple administrators are assigned different authorization codes for administration of the same account, and inclusion in the DNS records. In one embodiment, these administrators have different privileges (create accounts, view accounts, delete accounts). In other embodiments, these administrators may have the same rights. The assertion receiver 210 then associates the user account with the domain name that the user 200 claims to control.

In response to the assertion, the validation system 205 generates an authorization code in the authorization code generator 220. This code is then provided by the system to the user together with instructions for the user, as to how the DNS record 240 should be modified to include this authorization code. The user 200 then follows the instructions, electronically publishing the authorization code in the DNS record 240, and in the present exemplary embodiment, changing a SIP-related record of the DNS records to include the IP address supplied by the service provider IMprovider for the appropriate server for IM, such as 162. The system 205 validates the inclusion of the authorization code by accessing the DNS records, and verifying within the validation component 230 that a DNS record 240 contains the authorization code that was earlier provided to the user. After validation of domain name control has been successfully achieved, the user may be allowed to assign account names and passwords within an account creation component 270.

Consider another example of the creation of accounts by an administrator. User 200 creates a single account in this first session for user1 and then terminates the session. In a later session the same person makes use of the validation system 205 as an account requestor 280. The account requestor 280 then interacts with the account creation component 270 to authenticate that the account requestor 280 is the same user 200 who established service. This authentication is performed by receiving a username and password and comparing to that recorded by the user 200 earlier. After authentication, the administrator creates a second account for user2 and gives this account the password "pickles." As part of the login process, or the account creation process, the system 205 may revalidate the presence of the authorization code in the DNS record 240 associated with the domain name. In this example, two IM personal user service accounts have been created for IM: user1 @buycheese.com and user2@buycheese.com. Both of these accounts will be serviced by an IM server operated by the service provider IMprovider such as IM server 162 operated on server 160. As is appreciated by those skilled in the art, other methods of creating accounts may be used such as uploading or importing a list of accounts and passwords.

Figure 3A:
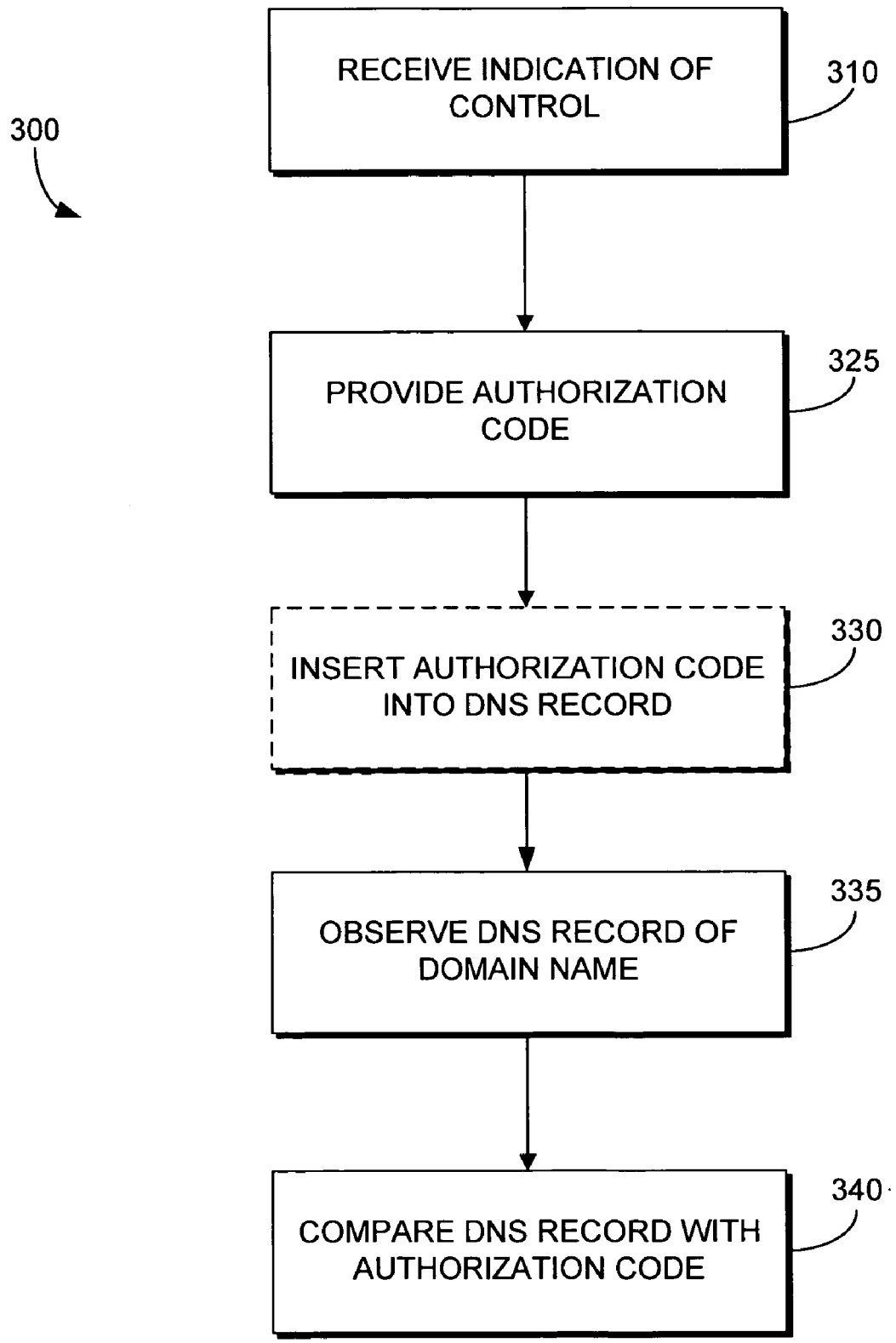
FIG. 3A is a flow diagram showing an embodiment of a method for validating the control of a domain.
Figure 3B:
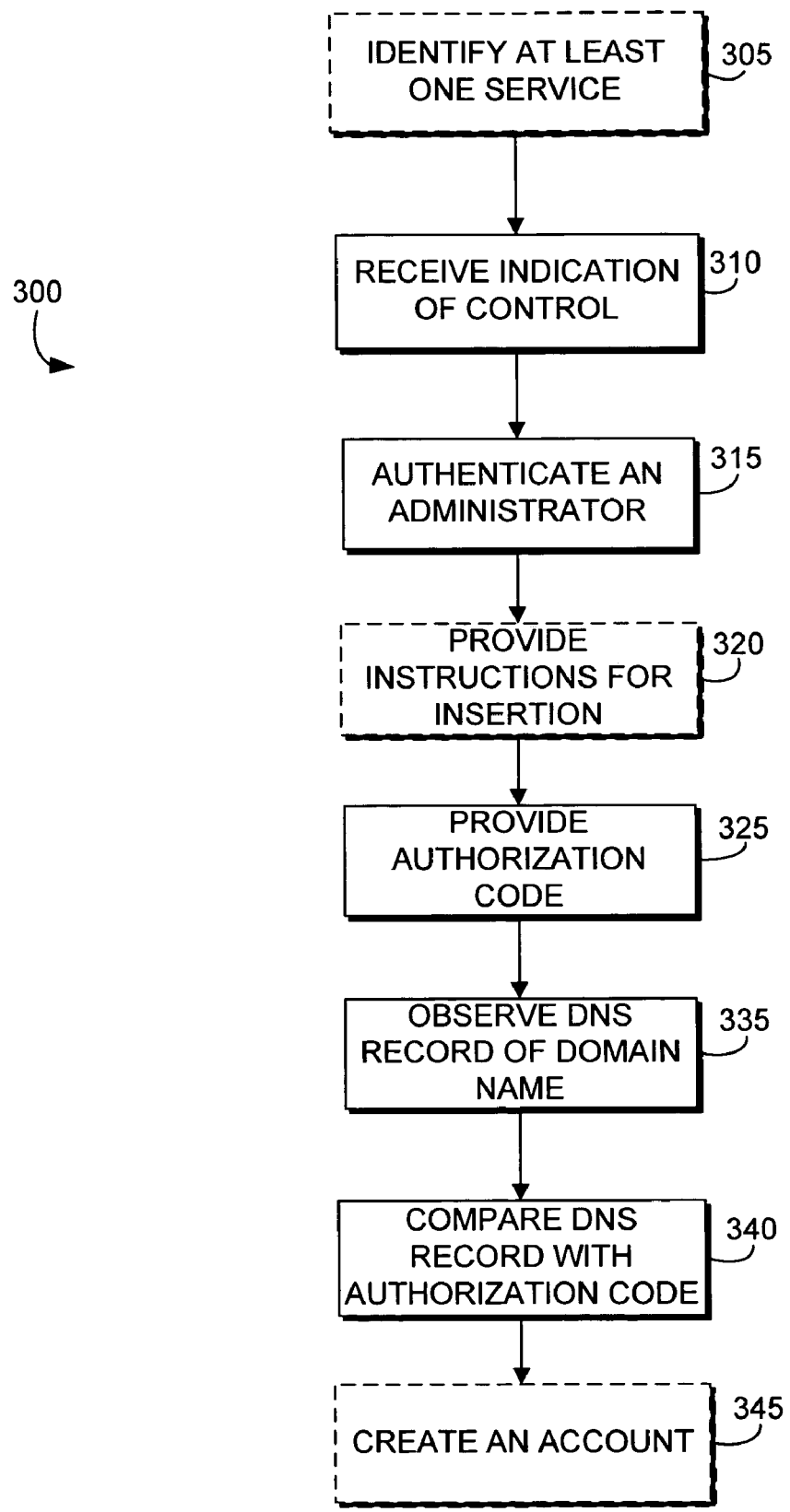
FIG. 3B is a flow diagram showing an embodiment of a method for validating the control of a domain.

Turning now to FIG. 3A and FIG. 3B, there are depicted flow diagrams of a method embodied in computer-useable instructions that are performed on a computer. This method receives an indication of control 310, which indicates that a particular user has the authority to control the use of a domain name. In one embodiment this receiving step is performed by displaying a web form to be completed by a user, having an embedded control that sends data which has been typed into a certain field. The user types in the domain name into the field, and the data is received by an application running on a remote server. There are many possible alternative methods for receiving the domain name that a user intends to validate. It could be earlier recorded and stored by another server, and associated with an account name, and finally sent from a remote API, to be received by the system. The domain name could be received from the user through a pop-up or active control. It could have been chosen from a menu of multiple domains through radio buttons. The indication of control could be either explicitly stated as part of the prompt for the domain name, or it could be implicit in a service offer that the user seeks. As appreciated by those skilled in the art, the step of receiving may encompass handling varied conditions such as domains being on a block list, unavailable domains, previously validated domains, etc. Such conditions may be handled for example by screening for blocked domains and halting the process, responding with an error message when a domain is not owned, responding with an error message when a domain is currently occupied, or offering an entered domain for purchase or resale when available.

The method then provides authorization code 325. In one embodiment, this providing step is performed as part of a transmission of a human-readable content such as a web page that displays the authorization code together with instructions for a user to manually modify his DNS record 240 to include the authorization code. In another embodiment, the providing step is performed as part of a transmission that communicates the authorization code to an API at a remote server. This API in turn automatically inserts the authorization code into DNS records 330 as shown in FIG. 3A.

The method then observes the DNS record of the domain name 335. As appreciated by those skilled in the art, this observation typically takes place by generating a query to obtain the current records of the DNS server. The query may make use of protocols such as EP and TCP or UDP, and requires at a minimum, the access of that portion of the DNS records that contains the authorization code. Other DNS records may also be of interest to a particular embodiment and so may be queried in conjunction with the record containing the authorization code, and may be compared with expected data (for example, the MX record for e-mail or a SIP-related record for IM).

The method then compares a DNS record with the authorization code in step 340. This verification could be retried through a periodically run job, or could be on demand by the user by, or on demand through an API. When this comparison verifies the publication of the authorization code in the DNS record, then validation of the control of the domain name is established. The comparison may be performed by comparing only a certain location within the DNS records, it may be performed by looking for a unique sequence of starting characters, or it may follow a parsing step which identifies the location to be compared, as appreciated by those skilled in the art. In the event that the comparison step does verify the publication of the authorization code in the DNS records, authorization is validated. Depending upon the embodiment and application this condition may be stored as a state within a server, or may only persist long enough to enable another event.

Turning now to FIG. 3B, there is depicted a flow diagram of a method embodied in computer-useable instructions that are performed on a computer. This method depicts a particular embodiment that enables a web service provider such as an e-mail provider to outsource one or more services, authenticate an administrator and enable account creation. The method begins by identifying at least one service in step 305. This identification could be made by an explicit data reception, or prompted by a user interface control that is activated. It could also be identified to the service provider implicitly by virtue of the associated page that is requested. For example, the hyperlink text may say "sign up my domain for email outsourcing," and the associated Uniform Resource Locator (URL) is a page that allows domain owners to outsource email implicitly. The identification step could also be more elaborate allowing a domain owner to select several services in succession, or choose from a menu of all available services. The result of the identifying step is that an outsource account manager server such as 168 residing on a server 160, is able to recognize at least one selected service chosen by the user of the service. In the present example, the email service is identified, and so outsource service is to be enabled for an email server such as 164 on server 160.

Next an indication of control is received in 310, and, in this embodiment, an administrator is authenticated in step 315. The administrator at least has authority to agree to the terms of the service on behalf of the owner of the domain name, but in this exemplary embodiment also takes a direct hand in governing accounts created under a domain name. The administrator is authenticated by asking for a user account name and password. If an account does not exist, then an appropriate account may be created by associating space for such an account and performing appropriate functions such as assigning an account name, receiving an approved password, and performing a challenge-response test. This account may be used by the administrator to change the services for a domain or to govern the account creation process. For these reasons, it is preferable to have the account be a private account accessible over a secure connection.

The embodiment of the method depicted in FIG. 3B then provides instructions for insertion 320 of an authentication code that is provided in step 325. In this embodiment, both steps are performed by transferring a web page to the domain owner with the first part of the instructions containing a procedure for modification, and the second part of the web page containing the authorization code. This web page also provides a procedure for inserting a supplied IP address into the MX record of the DNS records. In other embodiments, a hostname, possibly containing wildcard characters, could have been supplied for insertion into the MX record.

This embodiment of the method depicted in FIG. 3B then observes the DNS record of domain name 335, and compares the DNS record with the authorization code in step 340 as described above. This "observation" may be automatically tried after a period of time, or may be driven by the administrator explicitly triggering said action. In the event that the comparison 340 verifies the electronic publication of the authorization code within a DNS record, the method allows the creation of at least one account in step 345. In other embodiments additional tests may also be performed to verify that the service is properly configured. For example, as a condition of enabling account creation within the namespace, the system could verify that a correct IP address is contained within the Mx record, or alternatively that a hostname listed in the Mx record resolves to a correct IP address for the service. In one embodiment this account creation 345 is performed through a secure web connection with an administrator who logs into an administrator account, for example on an account manager server 168 on a server 160, by supplying his username and password. In this example, the user who creates accounts is the same user who signed in to get the authentication code. After logging in, the administrator creates accounts by individually typing in new usernames and passwords. In this example, email accounts are created in response to the administrator's selections, and email is accessible, for example through an email server 164 and an interface to this server either residing on a server 160 or directly through an e-mail protocol. Other methods of account creation are also possible as described previously. The email messages for created user accounts may then be handled by the e-mail service provider, but they are enabled under the domain name supplied by the user.

In one embodiment, multiple administrators are allowed to be validated for the same domain. A first administrator has an authorization code embedded in a DNS record, and later a second administrator is added and validated with a second authorization code being embedded in a DNS record. This validation method allows a smooth transition of domain administration from one person to another. For a period of time, both may be administering the domain. When the new domain owner is fully trained, the first administrator may have his rights revoked, by deleting the authentication code from the DNS record, and afterward performing validation. This embodiment also allows the privileges of former, or rogue administrators to be revoked by removing former administration codes, and by asserting validation of domain name control.

Figure 4:
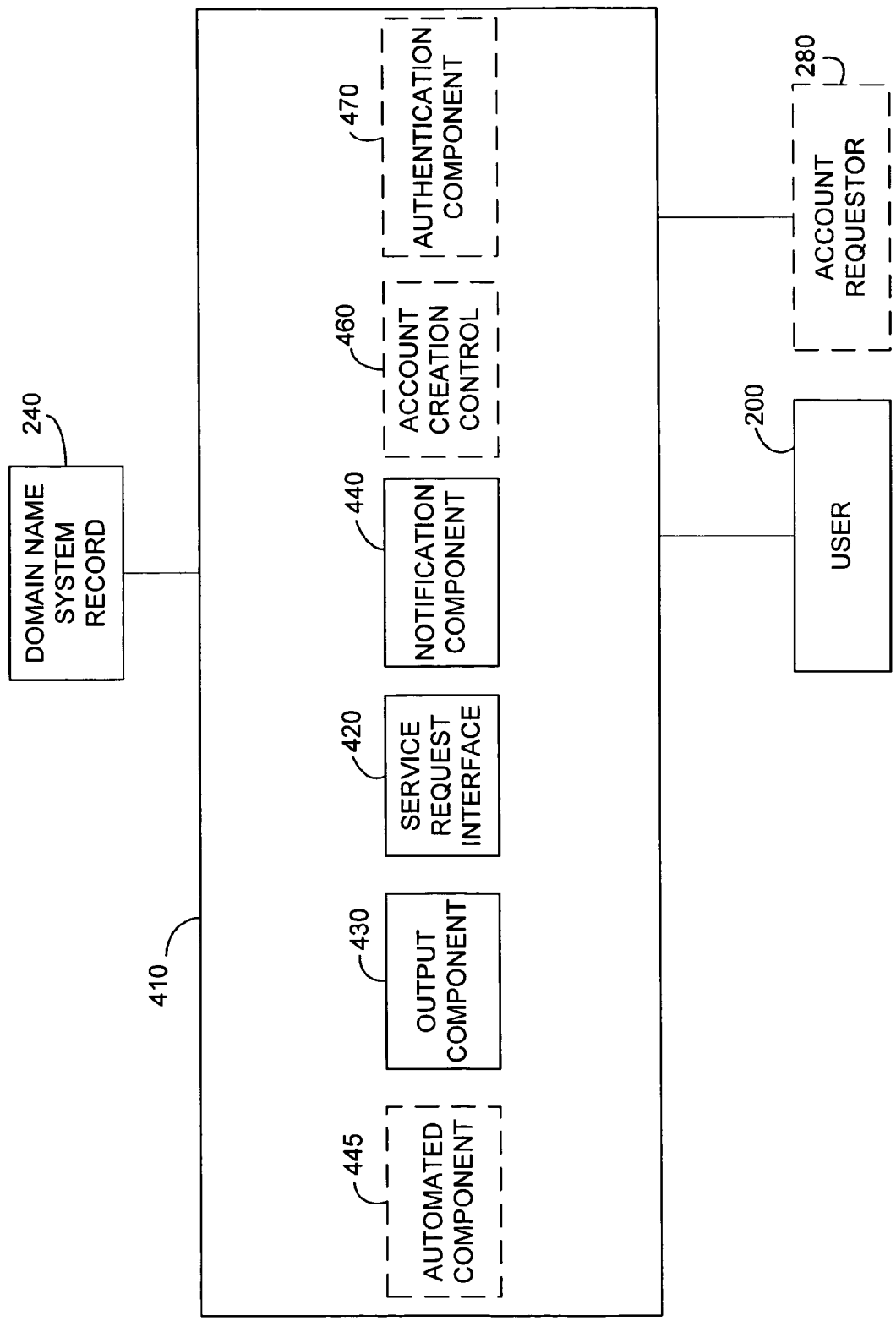
FIG. 4 is a diagram of an exemplary system, for initiating one or more services in connection with an indicated domain.
Figure 5:
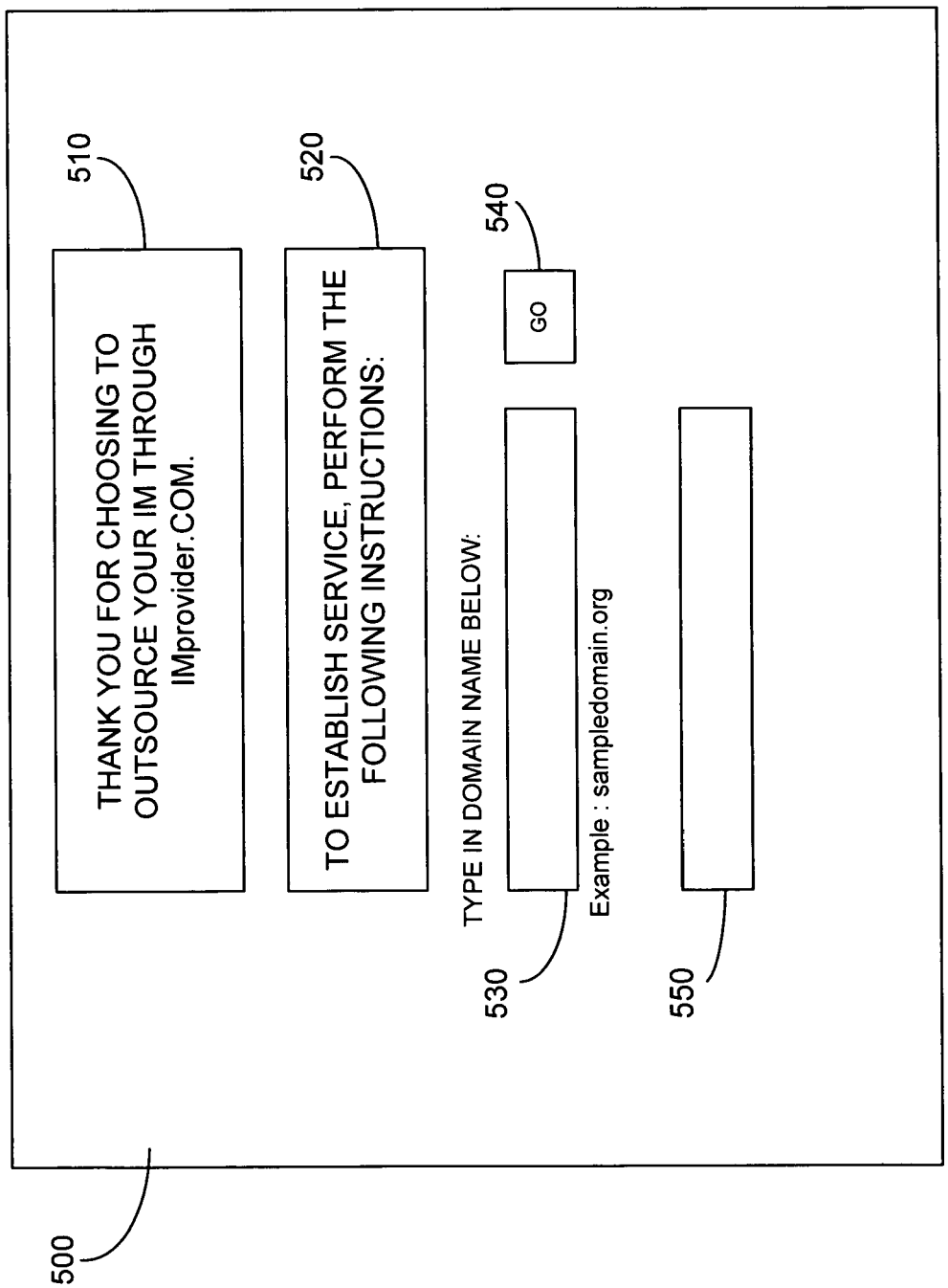
FIGS. 5, 6, 7, 8, 9, and 10 are exemplary screens for use in initiating IM service.
Figure 6:
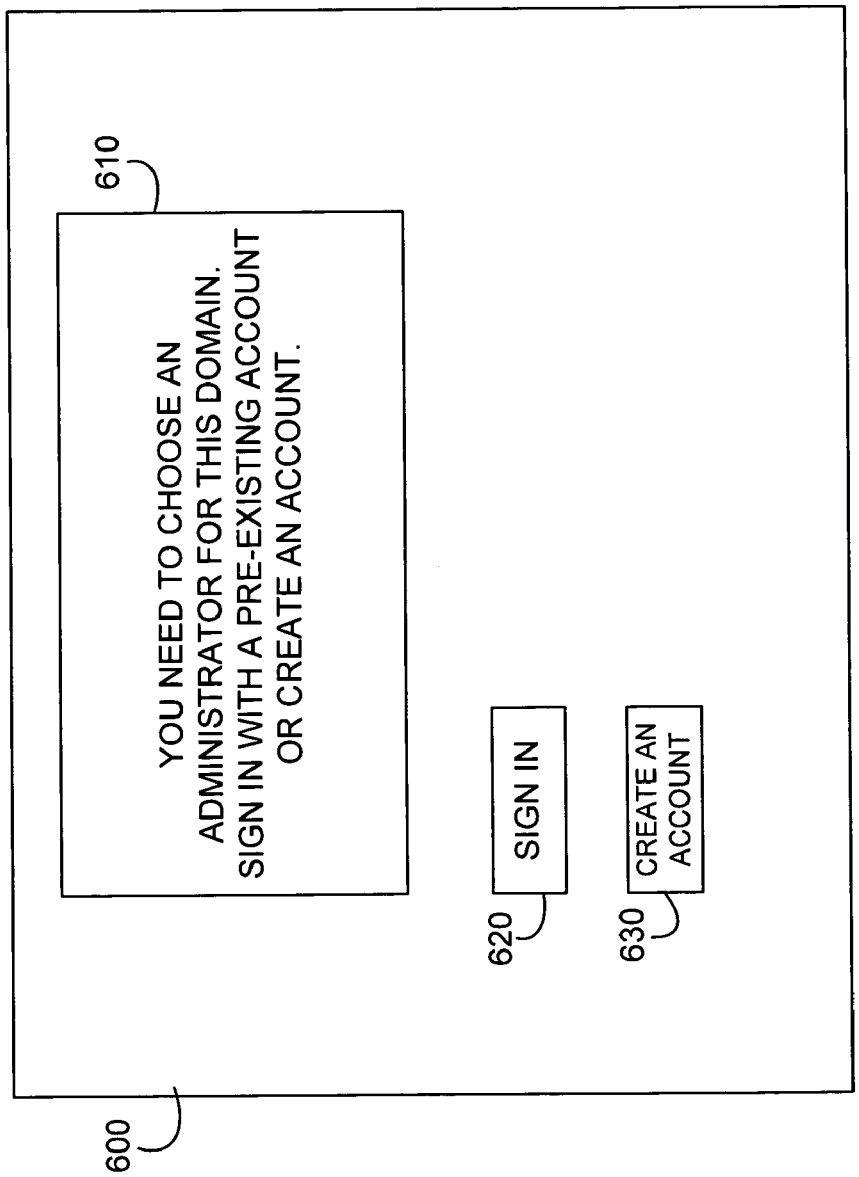

FIG. 4. depicts a representative system 410 for initiating one or more services in connection with an indicated domain and shows optional components with a dashed border. A user 200 interacts with a service-request interface 420 to supply an indication that a user 200 controls a domain and wants to initiate an outsource service associated with a domain name. This service-request interface may be a web-page appearing in a user browser 112 on a user computer 110. An output component 430 supplies at least one authorization code to be published in a DNS record. In one embodiment this output component is a web page that displays to the user on a UI 114 within a user browser 112 of the user computer 110 an authorization code and instructions for inserting this authorization code in the DNS record 240. In an alternative embodiment, an automated component 445, such as an API, automatically modifies the DNS record 240 associated with the domain. In this alternative embodiment, a provider could call this API and make changes automatically for the user. The system 410 verifies the publication of the authorization code in the DNS record 240. A notification component 440 indicates to the user 200 that a service has been successfully established, when the authorization code is found within the DNS record 240. This notification may for example be in the form of a web page presented on a UI 114 display of a user browser 112 running on a user computer 110. This notification could alternatively be an e-mail message sent to the user.

In one exemplary embodiment of the system 410 depicted in FIG. 4, an account creation control 460 is present. This control may, for example, be a web page communicated over a secure connection, using the https protocol. In this embodiment, an account requester 280 is only able to create accounts after he or she has satisfied the requirements of an authentication component 470. These requirements may include, for example, the verification of an administrator account name and password, and a revalidation of the presence of an authorization code in the DNS record 240. In another embodiment, the account creation control 460 automatically grants accounts according to a predefined policy as described in a previous embodiment, as discussed above.

FIGS. 5, 6, 7, 8, 9 and 10 are provided to illustrate one possible implementation of a particular embodiment of domain validation in connection with service outsourcing. An offer is made to a domain owner to outsource IM. This offer could have been by email invitation, or by advertising on a registrar page, or simply offered as a control on a given web page. When the offer is selected, a server such as server 168 presents screen 500 depicted in FIG. 5, followed by screen 600 in FIG. 6. Screens 500 and 600 together constitute the service request interface 420 once they are downloaded to the user computer 110 and displayed for example on the UI 114 of the user browser 112. A user 200 is able to see a greeting in a first display area 510 and an overview of the instructions in a second display area 520. The user 200 types in his domain name in field 530 and activates a control 540 that transmits the data entered to an assertion receiver 210 residing on the server 160. If there are any errors in the submission, the user is returned to screen 500 with an error message in field 550: Otherwise, the browser 112 displays 600, informing the user of the need to define an administrator account in display field 610. The user either makes use of an existing account by the selection of control 620, or creates an account using control 630. As appreciated by those skilled in the art, this account may be created through any account authentication system. Examples include creation of an account with the service provider in a compatible form such as associating a name and password with an account, associating an email and a password with an account, performing certificate authentication, or performing, New Technology Lan Manager (NTLM) authentication.

Figure 7:
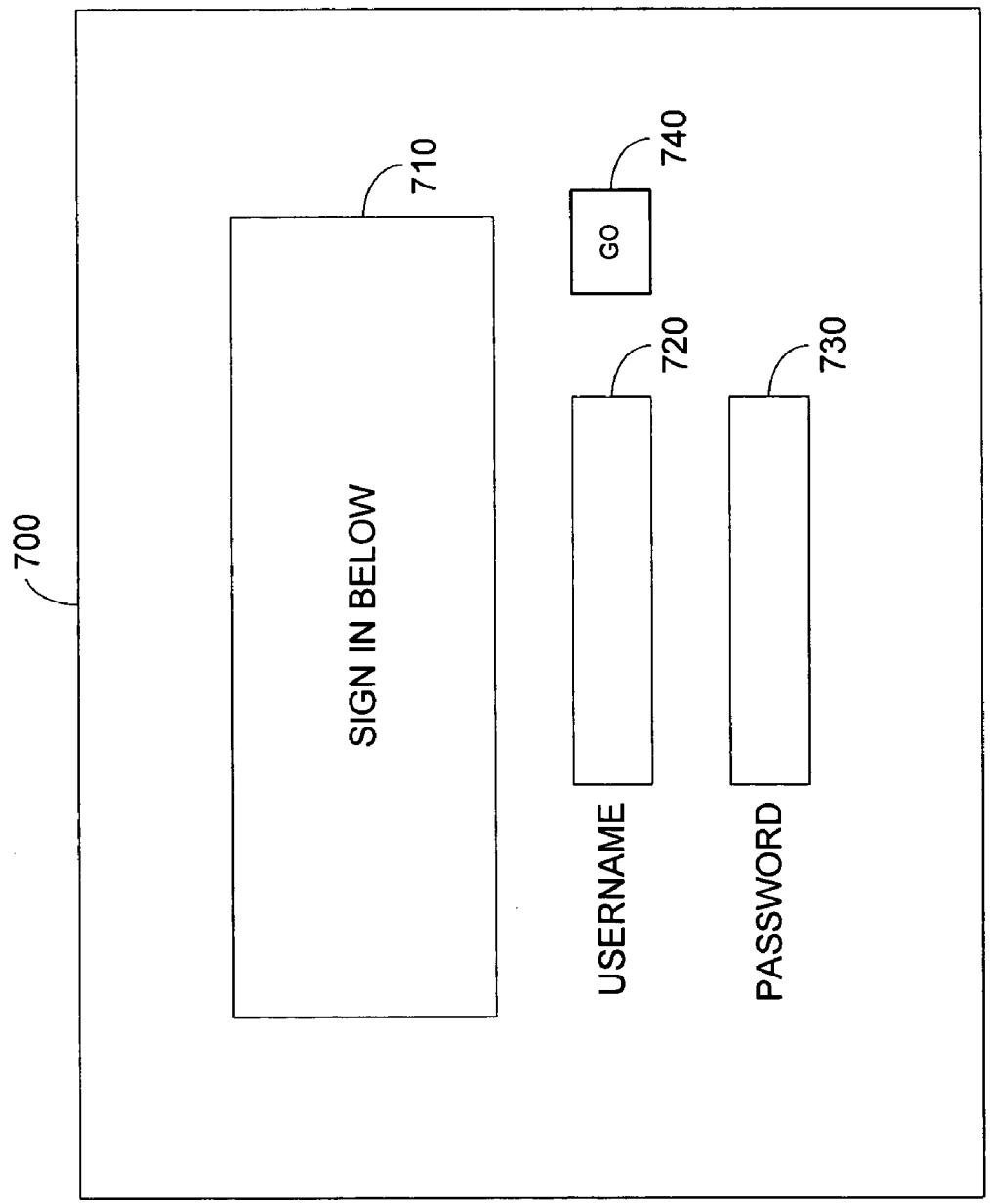
Figure 8:
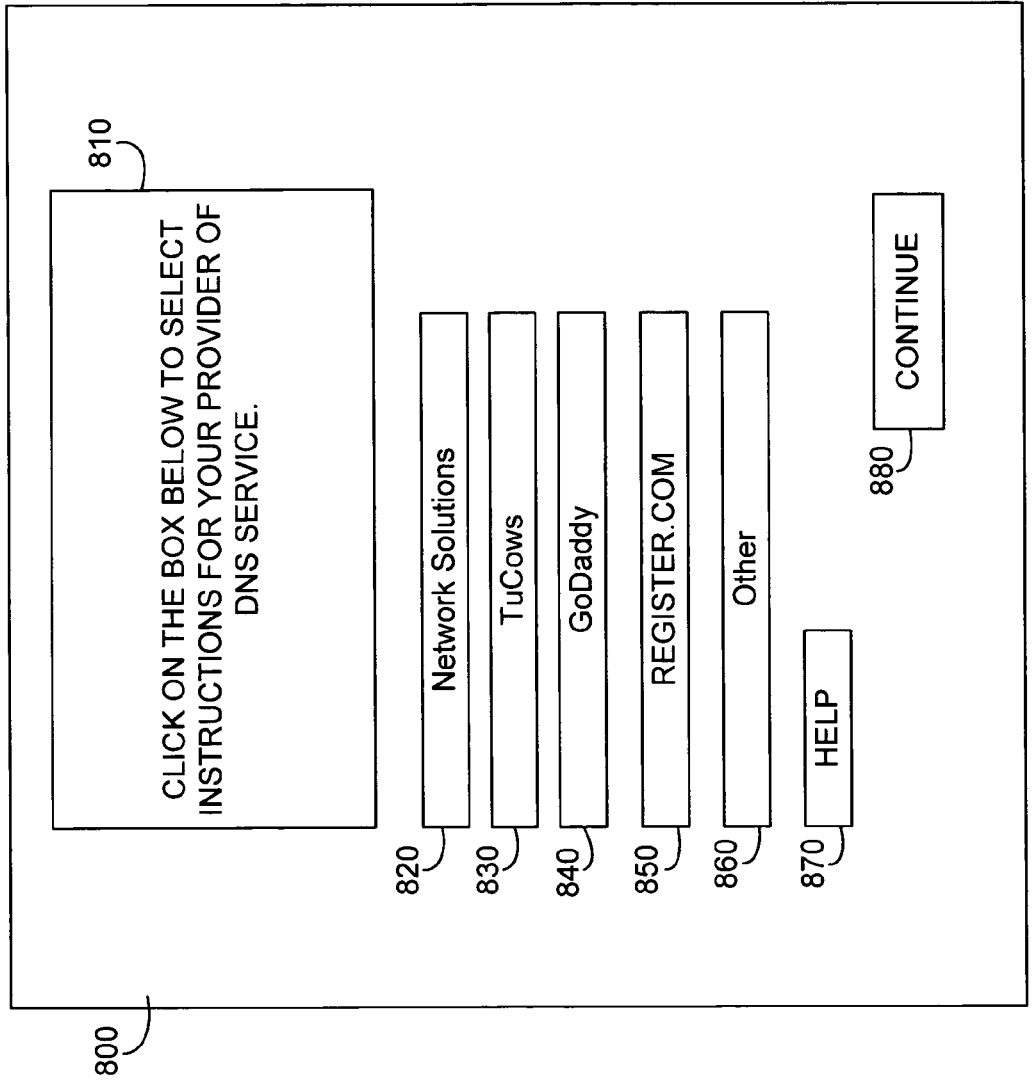
Figure 9:
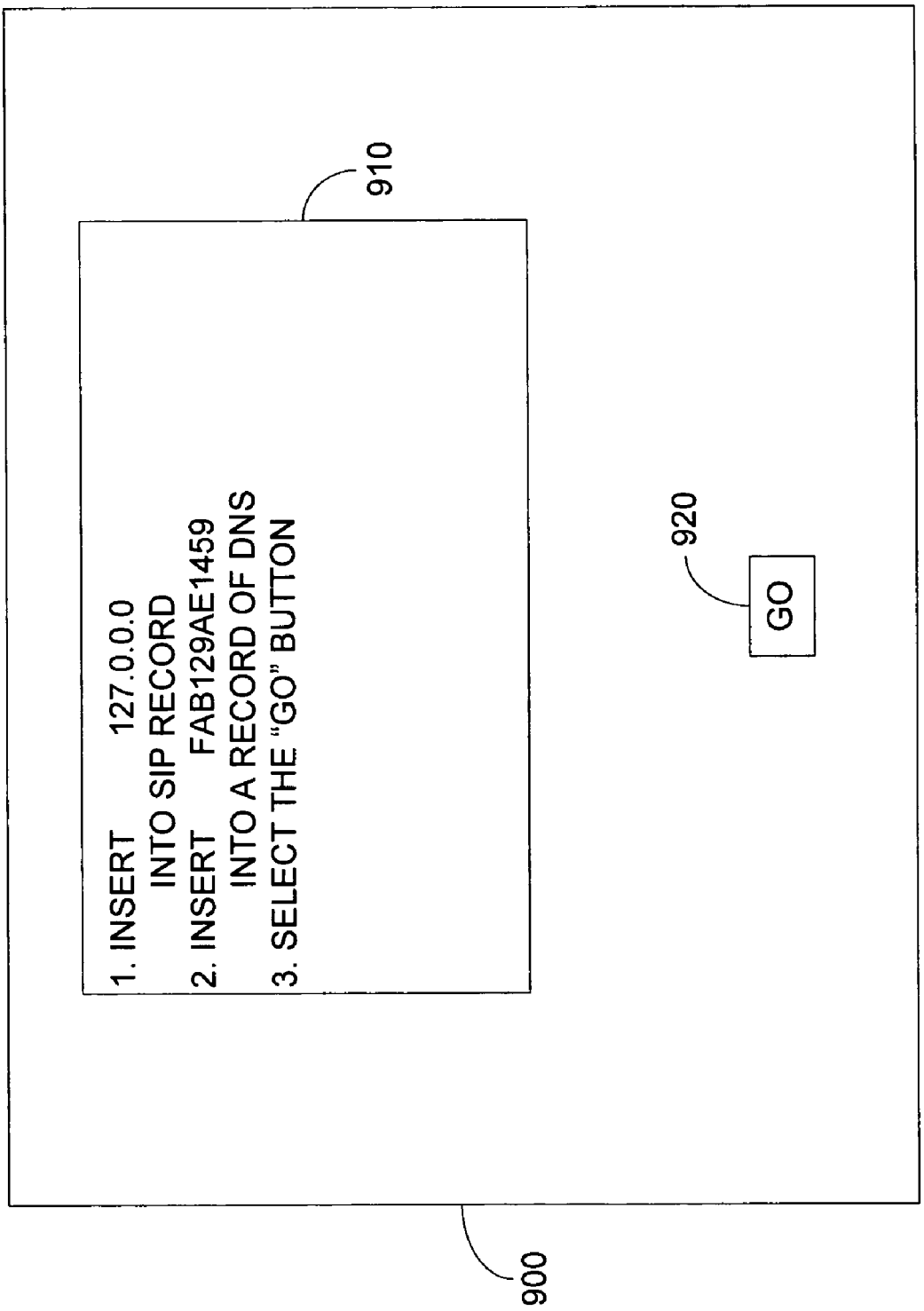

In one embodiment if the user chooses 620, then the browser 112 displays screen 700 as shown in FIG. 7. Screen 700, simply presents some instructions in information field 710, and collects inputs to authenticate an administrator, allowing the user 200 to supply a username in field 720 and password in field 730. Authentication is activated by selecting control 740. The assertion receiver 210 receives administrator account information, and returns instructions and an authorization code to the user 200. The output component 430 is illustrated in screen 800 in FIG. 8 and screen 900 in FIG. 9. Screen 800 displays an information field 810 and a number of control fields 820, 830, 840, 850, 860, 870, and 880 to facilitate the selection of instructions tailored to the users situation. Information field 810 may alternatively contain the specific IP addresses and DNS entries to make. These fields provide the user the opportunity to select tailored instructions for different registrars in control fields 820, 830, 840, 850, and 860. A help screen is selected when control 870 is activated. Control 880 selects the option to provide brief instructions, for one skilled in the art. Screen 900 in FIG. 9, illustrates bulleted instructions in field 910. These instructions are provided for illustration purposes only, and so would not be given in an actual working example. Instruction 1 tells the user to insert an IP address into a SIP-related record. The address chosen 127.0.0.0 is a loopback address. In a real application, a functional address for a service provider for the service provider would be provided. Instruction 2 provides an authorization code and tells the user to insert this in a DNS record. The user completes these first two instructions, and then activates control 920 to indicate that modification of the DNS records is complete. When this control is selected, the validation component 230 accesses the DNS record and determines whether the authorization code is published in a DNS record. As appreciated by those skilled in the art, the validation may operate successfully while taking place asynchronously. That is, a user validation might be suspended for a period of time, and the validation forced by the same or a control similar to 920.

Figure 10:
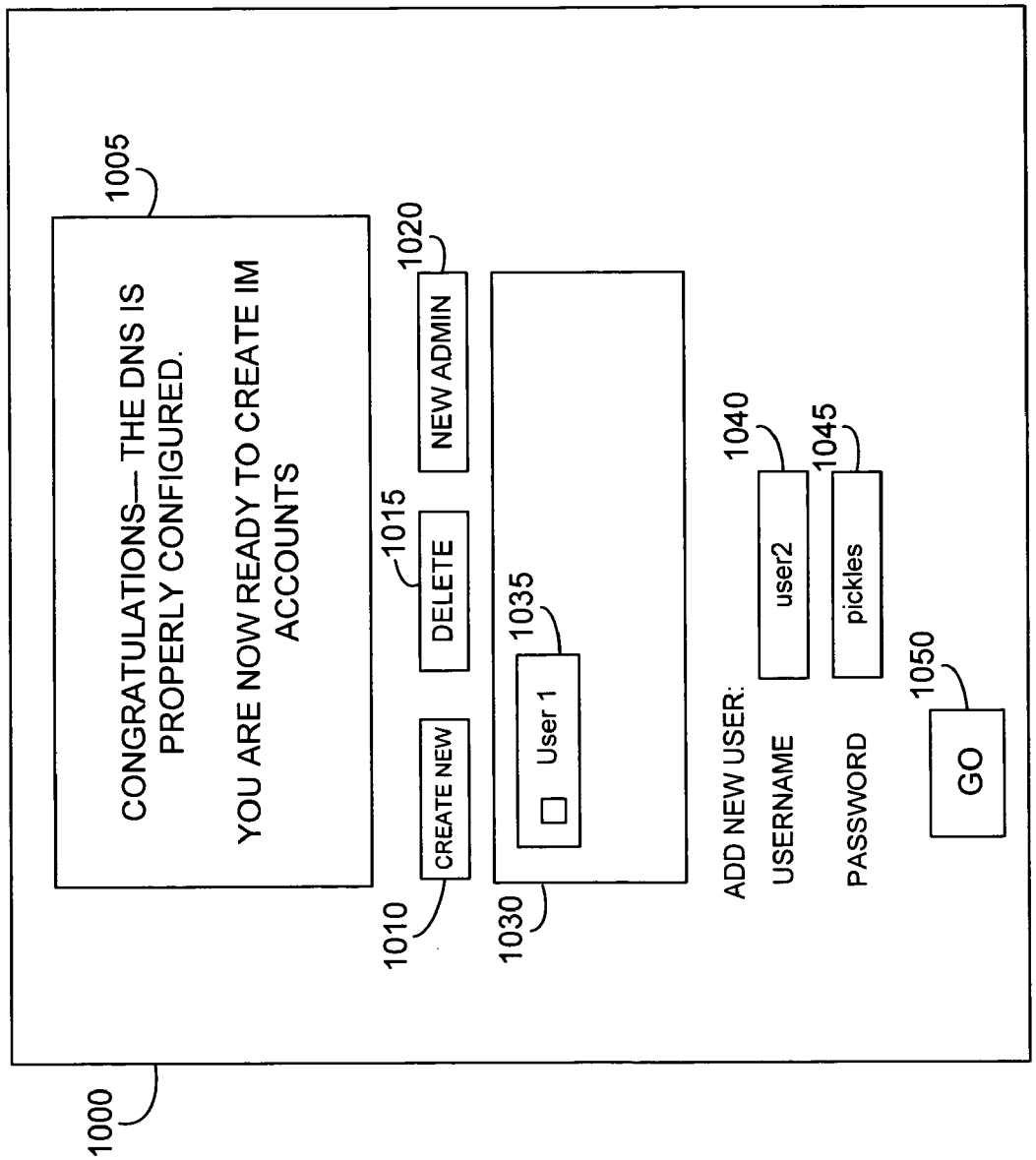

If this validation is successful, then the UI 114 of the browser 112 displays screen 1000 depicted in FIG. 10. Screen 1000 contains a notification component 440 consisting of a notification field 1005 and a control 1010 that allows the user to create a new outsource service. Screen 1000 also contains a representative account creation control 460 that comprises a display of successfully created account names 1030 such as 1035, and a new account name field 1040 and new account password field 1045, and a new account activation control 1050. Other controls may additionally be available such as a control to delete an account 1015 or to define a new administrator 1020.

Alternative embodiments and implementations of the present invention will become apparent to those skilled in the art to which it pertains upon review of the specification, including the drawing figures. The specific features and methodological acts are disclosed as example forms of implementing the claims. Accordingly, the scope of the present invention is defined by the appended claims rather than the foregoing description.

We claim:

1. A system, operable on one or more computers having one or more processors, for validating control of a domain, said system comprising:
   an assertion receiver component that receives an indication that a user exercises control a over domain name;
   an authorization code generator that in response to said indication provides an authorization code to be electronically published within a record that indicates at least one server that provides Domain Name System services associated with said domain name, and wherein said assertion receiver component is configured to provide said user with said authorization code and instructions to modify said record;
a validation component configured to access, via said one or more processors, said record and to determine whether said authorization code is published within said record, wherein said validation component is configured to observe said record associated with said domain name and to compare said record with said authorization code, and
an account creation component configured to identify at least one service to be provided by a web service provider and to create one or more user accounts having said domain name, wherein said account creation component is configured to authenticate one or more administrators for control of said at least one service.

2. The system of claim 1, wherein said assertion receiver component further comprises an assertion generator Application Programming Interface configured to automatically modify the Domain Name System record.

3. The system of claim 1, wherein the assertion receiver component is configured to identify at least one service to be provided by a web service provider.

4. The system of claim 1, wherein said account creation component is further configured to create at least one account automatically.

5. One or more non-transitory computer-readable media, operable on one or more computers having one or more processors configured to perform a method for validating control of a domain, said method comprising:
receiving an indication from a user that said user exercises control over a domain name;
in response to receiving said indication, providing an authorization code to be electronically published in a record that indicates at least one server that provides Domain Name System services associated with said domain name;
providing said user with said authorization code and instructions to modify said record;
validating, via said one or more processors, that said authorization code was published within said record, wherein said validating includes observing said record associated with said domain name and comparing said record with said authorization code;
identifying at least one service to be provided by a web service provider;
creating one or more user accounts having said domain name, and authenticating an administrator for control of said at least one service.

6. The non-transitory computer-readable media of claim 5, wherein said method further comprises creating at least one account having said domain name.

7. The non-transitory computer-readable media of claim 6, wherein said creating at least one user account operates automatically according to a predefined policy.

* * * * *